June 4, 1968  F. WENDLER ETAL  3,387,110
APPARATUS FOR UNIFORM FEEDING OF POWDER
INTO A PLASMA SPRAY GUN
Original Filed Sept. 13, 1965  3 Sheets-Sheet 1

United States Patent Office 3,387,110
Patented June 4, 1968

3,387,110
APPARATUS FOR UNIFORM FEEDING OF POWDER INTO A PLASMA SPRAY GUN
Friedrich Wendler, Erlangen, and Gunter Nette, Schnellenbach, Germany, assignors to Siemens Aktiengesellschaft, Munich, Germany, a corporation of Germany
Continuation of application Ser. No. 490,153, Sept. 13, 1965, which is a continuation-in-part of application Ser. No. 300,569, Aug. 7, 1963. This application Mar. 30, 1967, Ser. No. 627,269
Claims priority, application Germany, Aug. 25, 1962, S 81,100; Sept. 12, 1964, S 93,130
5 Claims. (Cl. 219—76)

ABSTRACT OF THE DISCLOSURE

Plasma spray apparatus includes a burner channel, feed pipe means connected with the burner channel for supplying a flow of plasma-producing gas thereto, electrode means for forming an arc in the channel so as to generate a plasma from the gas flowing through the channel, nozzle means located in the channel downstream from the arc, an elongated plasma passage having an end connected with the downstream end of the burner channel and an outlet at the other end thereof, the plasma passage being traversable by the generated plasma for discharging the plasma through the outlet, and powder supply means communicating with the plasma passage at a location downstream from the nozzle means, and distant from the outlet for feeding a powder to the generated plasma traversing the plasma passage, the electrode means comprising a pin-shaped cathode and an anode member forming the burner channel, the burner channel being cylindrical and having an axial length in the order of magnitude of substantially two to four diameters of the burner channel, the cathode extending into the burner channel a distance up to substantially one-third the axial length of the burner channel, the nozzle means being located at the downstream end of the burner channel, and the powder supply means comprising a powder suction tube connected with the plasma passage at the downstream end of the burner channel.

---

Our invention relates to apparatus for the uniform feeding of powder from a powder supply container into a plasma spray gun and is a continuation application of our application Ser. No. 490,153, filed Sept. 13, 1965 which was a continuation-in-part of our application Ser. No. 300,569, filed Aug. 7, 1963, both now abandoned.

When using plasma burners for the spraying of powder it is important that the powder be fed uniformly. In known plasma guns powder is forced through a sieve and a feed pipe into the burner channel under low pressure, usually with the aid of a vibrating device. When powder of small grain diameter is used, the mesh openings in the sieve become clogged or the powder feed channel becomes choked very easily with the finely granulated material to such an extent that feeding of the power take place only intermittently and ceases entirely after awhile.

It is an object of an invention to provide an apparatus for feeding powder uniformly into a plasma spray gun which permits storing of a relatively larger powder supply in the supply container at one time.

It is another object of our invention to provide a powder feed apparatus for a plasma spray gun in which metering of the powder is greatly simplified, as control thereof is effected by the flow conditions in the plasma channel of the burner.

It is a further object of our invention to provide an improved plasma spray gun utilizing this powder feeding apparatus which avoids the aforementioned disadvantages of the heretofore known plasma spray guns.

In accordance with one aspect of our invention, we include in a powder supply attachment for uniform feeding of powder to the burner channel of a plasma spray gun, a nozzle which is aligned with the burner channel and which has a cross-sectional area that differs from the cross-sectional area of the burner channel. A powder feed passage is connected at one end to the nozzle and has an end portion at the other end thereof which extends at least in part into a powder supply container. The end portion of the powder feed passage means is movable in a direction for selectively shortening and lengthening the part of the end portion which extends into the supply container.

In accordance with another aspect of our invention, we provide the power supply container with a wall having an internally threaded bore and a tubular end portion of the powder feed passage with an external thread conforming to and threadedly turnable in the threaded bore of the container wall so that the tubular end portion is movable in a direction along the axis of the thread to selectively shorten and lengthen the part of the tubular end portion that extends into the supply container.

In accordance with yet another aspect of our invention we provide means for feeding gas into the container through an opening in a wall thereof which is located opposite the wall in which the threaded bore is formed, so that the powder in the container is whirled around and finely separated by the gas.

In accordance with still another aspect of our invention, the cross-sectional area of the nozzle is larger than that of the burner channel so that the pressure of the plasma gas in the nozzle is lower than in the burner channel and the powder in the supply container is drawn by suction into the nozzle through the feed passage.

The apparatus according to our invention is generally usable with a plasma burner for spraying metallic or ceramic powder, for example on any supporting material.

Such plasma burners for spraying pulverulent materials in molten state have an ever increasing range of utility. They are used at times for applying material which, due to its high melting point, such as for example in the case of tungsten, cannot be handled by other processes to provide a coating or plating for workpieces of materials that are difficult to process. For this purpose, rotary forming rods, for example, can be used, on which the desired material is sprayed, and which can then be melted or burned out of the thus completed workpiece.

In accordance with additional aspects of our invention we provide a plasma spray gun, wherein the plasma, formed in a legnth of an electric arc in the burner channel, passes through a nozzle located in the channel of the burner, a powder feeding tube or channel being connected behind or downstream of the burner channel.

The working gas is thereby ionized in the arc portion so that it develops the characteristics of plasma. An advantage of this plasma spray gun is that the supplied quantities of powder can be varied with change in the flow relationships in the nozzle. The flow relationships in turn can, for example, be affected by the power of the arc.

The problem heretofore generally appearing for plasma burners was to supply power to the working gas in a relatively small space. Therefore, it was endeavored with a heretofore known plasma burner, to so constrict the arc and a surrounding gas jet through a nozzle that the arc and the gas jet form one and the same current or flow. For that purpose, provision was made in this known burner, for the arc discharging or burning between the electrodes to be blown into the constricting nozzle bore with the aid of the gas current. This had a disadvantage in that the nozzle was placed under very great stress and therefore had only a relatively short life span. Notwithstanding the limited durability of this nozzle, one might nevertheless consider using this nozzle with powder suction apparatus by, for example, connecting a powder channel behind or downstream of the nozzle. Such construction has been found to be disadvantageous, however, because the powder then is melted in such a way in the electric arc, particularly at the low point of the arc, that it deposits on the channel walls, so as to thereby cause possible destruction of the burner channel.

In order to avoid the aforementioned difficulties, the powder was supplied under pressure with an auxiliary transport gas into the burner channel in other heretofore known plasma spray guns. This caused the further disadvantage, in addition to the disadvantages of fluid flow techniques, in that a relatively large amount of cool gas was admitted to the hot zone of the burner channel.

Since it was found that, due to disturbed flow conditions, the powder feed tubes become obstructed, it was also suggested that powder be admitted by means of a transport gas only just in front of the outlet opening of the plasma-conveying channel and behind or downstream of the burner channel proper in which the arc is formed. Great difficulties are caused, however, in melting the powder sufficiently or adequately. On the other hand, focusing of the melted powder in the plasmas jet necessitates having a sufficiently long channel extending past the location at which the powder is added.

Another known suggestion has, therefore, provided for supplying the coating or plating material to a plasma burner in original rod form. In that case, one must make allowance for the fact that rods must first be pressed out of the powder which is to be deposited or plated, and which, moreover, for many materials, are very brittle and easily breakable. It is also not so easy to feed or supply the rods to the plasma burner so that the flow relationships remain undisturbed.

In accordance with an aspect of our invention, the aforementioned difficulties are overcome in a relatively simple manner by providing a plasma gun having a nozzle to which the outlet of a powder suction channel is connected outside of the length of electric arc.

The invention of this application furthermore recognizes the fact that the powder supplied to the working gas by means of the arc solely depends on the arc voltage and current strength as well as on the quantity of surrounding gas flow at the arc. The arc voltage can be increased accordingly by current-dependent lengthening of the arc. The quantity of gas passing into the arc is consequently largely independent of the choice of diameter for a nozzle located substantially around the gas flow and arc. One can therefore dispense with an additional nozzle located around the arc and gas flow whereby the durability and efficiency are increased. The arc can then burn against the wall of the burner chamber or channel, connected for example as the anode.

The particular advantage of a plasma spray gun constructed in accordance with the invention of this application which includes a nozzle and a powder suction channel, lies in the output-dependent automatic control of the powder feed.

If the gas throughput for the plasma spray gun is increased, the foot of the arc burning under the flow is carried off by the gas flow whereby the increased length of arc has a higher voltage and can consequently deliver greater power. The plasma is thereby heated more strongly and the flow velocity through the nozzle connected with the outlet of the powder suction channel is increased whereby the negative pressure in the suction tube or duct is increased and more powder is supplied.

If, on the other hand, a greater current is supplied to the arc, for example by reducing the size of the limiting resistance, the plasma is also heated more strongly and, for a greater plasma flow, more powder is sucked in. Since the gas passing into the arc is ionized and heated, there is a simultaneous increase in the conductivity in the arc path—the arc is carried by the gas—whereby the current strength can increase further. The end result is that more powder is sucked in for a larger plasma throughput and a greater flow. For a plasma spray gun constructed in accordance with the invention of this application, the most favorable quantity of powder is consequently always fed automatically. For the heretofore known flame spray guns whereby powder is occasionally sucked in, the matter of automatic control does not come into play because the powder is added to cold gas which burns with a flame at the channel end. Therefore, no particular difficulties are experienced with regard to powder suction for such flame spray devices.

The foregoing and other objects, advantages and features of our invention will be apparent from the preferred embodiment illustrated by way of example on the accompanying drawings in conjunction with the following detailed description. In the drawings.

Figure 1:
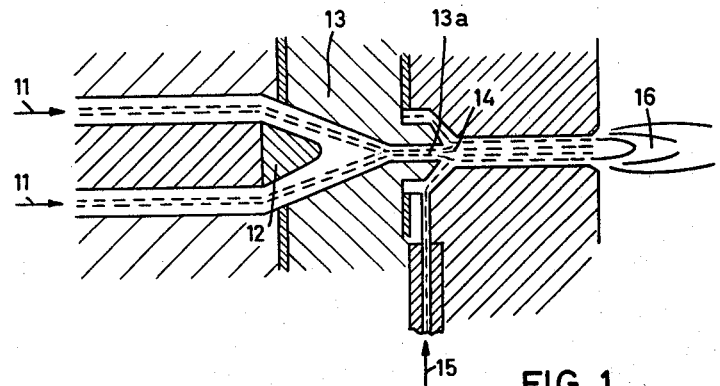
FIG. 1 is a schematic sectional view of a plasma burner with a reduced cross section in the plasma burner channel constructed in accordance with our invention.

Referring now to the drawings and particularly to FIG. 1, there is shown in the plasma gun a gas feed pipe 11 for the plasma which is to be generated, a cathode 12, and an anode 13 which defines a plasma burner channel 13a of suitable cross-sectional area. A nozzle passage 14 is aligned with the burner channel 13a and has a cross-sectional area that is larger than that of the burner channel 13a. A plasma beam 16 issues from the nozzle 14. Powder is fed through a feed passage tube 15 from a powder supply container not shown in FIG. 1 but shown enlarged in FIG. 2, which is hereinafter described in greater detail. In the burner channel 13a of narrower cross section immediately upstream of the nozzle 14, the stream lines of the gas are pressed together and the velocity of the gas stream is increased, whereas in the nozzle 14 of greater cross section there is a reduction of the gas stream velocity. The tube or side channel 15 for feeding powder connects with the burner channel of narrow cross section and the nozzle of wide cross section at the boundary therebetween and the powder is accordingly sucked out of the powder supply container due to the low pressure at that boundary. By changing the flow condition in the nozzle, the low pressure that is produced therein and consequently the amount of powder that is being fed may be varied.

Figure 2:
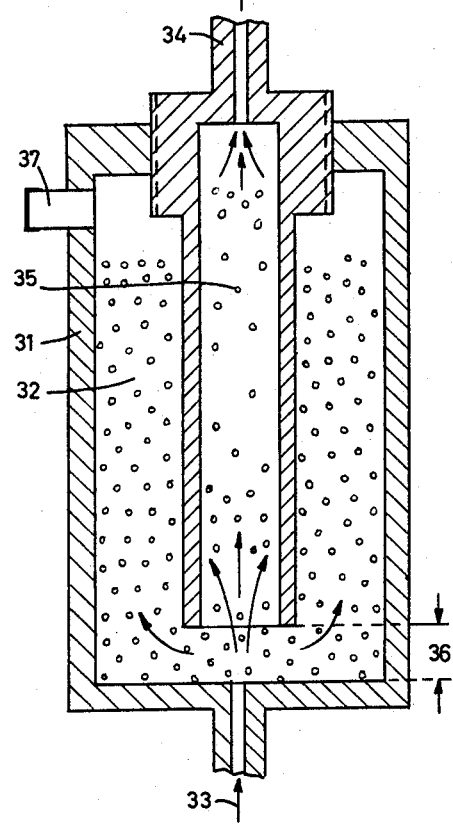
FIG. 2 is a schematic sectional view of a powder supply container with a continuously movable turbulence and suction pipe constructed in accordance with our invention.

The basic operating principle of the powder supply container can be determined from FIG. 2. The container 31 is shown filled with a powder supply 32. A gas feeding tube 33 connects with the container 31 at one end thereof and a powder suction channel 34 is located at the opposite end of the container 31, leading to the powder feeding tube 15 that is connected to the plasma burner. At least part of a turbulence and suction tube 35 extends into the container 31 from the powder suction channel 34 and although shown as being integral with the suction channel 34 in FIG. 2 may, however, be connected thereto by any suitable means. A space 36 separates the free end of the turbulence and suction tube 35 from the wall of the container 31 through which the gas feed tube 33 opens into the container 31. An inlet connecting piece 37 is provided in a side wall of the container 31 through which powder is admitted to the container. By continuously changing the spacing 36 between the lower wall of the container as shown in FIG. 2 and the turbulence and suction tube, for example by turning the externally threaded turbulence and suction tube 35 clockwise or counterclockwise, as the case may be, in a corresponding screw thread formed in the upper wall of the container 31, the tube 35 is movable in a direction along the axis of the thread for selectively shortening or lengthening the part of the tube 35 which extends into the powder supply container, and the feeding of a specifically desired amount of powder for the burner can thereby be adjusted.

A working gas is led through the inlet tube 33 into the container 31 not so much for the purpose of forcing the powder into the burner but rather simply to agitate the powder (the material to be injected into the plasma gun channel). All gases which do not have strongly erosive effects are suitable for this purpose, for example inert gases (royal gases) or a nitrogen-hydrogen mixture consisting of 90% nitrogen and 10% hydrogen. A gas of this type is led into the container 31 through the channel 33 and causes the powder supply in the container to whirl about within the container. The stirred-up powder is then drawn off by suction without difficulty from the upper part of the container. Fine powders which have a tendency to form clumps rather easily can consequently be fed without trouble through the powder suction channel 34 without any particular handling or processing such as prior processing by granulation, requiring only that a suitable supply level of the powder be maintained in the powder container 31.

Figure 3:
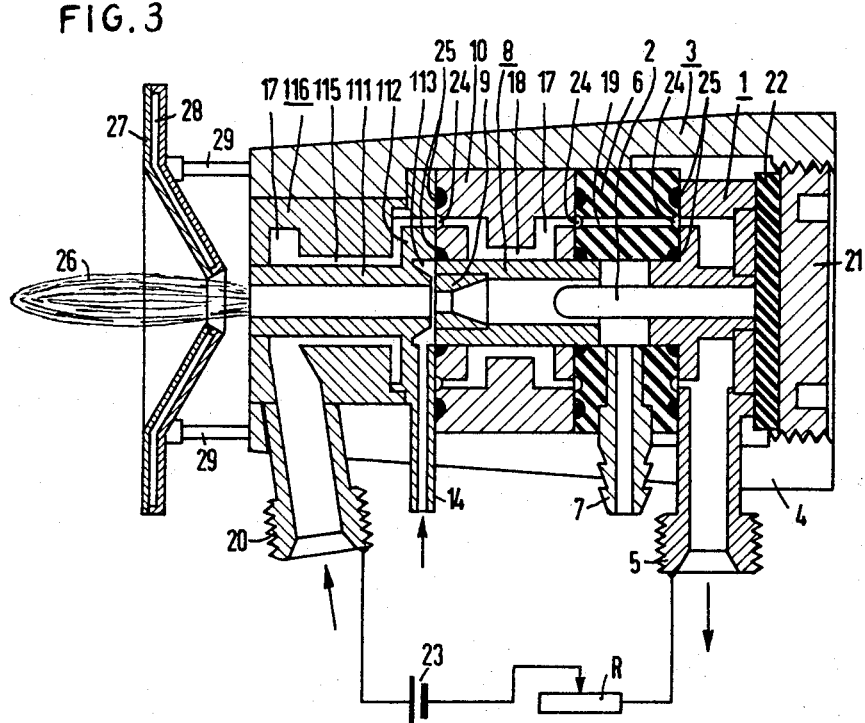
FIG. 3 is a longitudinal section of a plasma spray gun constructed in accordance with our invention from standardized manufacturing components.

In the embodiment of FIG. 3 there is shown a plate-shaped cathode holder 1 of a material such as brass. Centrally inserted is a pin-shaped cathode 2, which can be made of tungsten. The cathode 2 has a diameter of substantially four millimeters and is electrically insulated from the cylindrical casing 3, for example of steel, by the fact that the plate-shaped holder 1 is spaced from the casing 3. At the bottom of the casing 3, as seen in FIG. 1, a slot 4 for supply leads or conduits is milled, and is widened around the coolant outlet tube 5 as seen for the component at the upper part of FIG. 4. An electrically insulating ring 6, for example of vulcanized rubber, follows with a connecting tube 7 for a hose, consisting for example of polyvinyl chloride (PVC), for supplying working gas. The cathode extends into the burner channel 8 at most to about one-third of the length of the burner channel, which consists of copper and is shaped as an anode. At the flow end of the burner channel 8 there is inserted a nozzle 9 of tungsten, for example. The burner channel has a length of substantially 20 millimeters and a diameter of about 5 millimeters. The overall axial length of the nozzle 9, including the portion thereof of uniform diameter, is substantially 6 millimeters long and has a diameter of about 3 millimeters. Burner channel and nozzle are surrounded by a cooling ring member 10 of brass.

The channel lying downstream from the nozzle conveys the plasma to the workpiece and is referred to herein as the plasma channel 111. A smooth surface is essential in the plasma channel 111. The channel member 111 can consist of copper whose channel bore is polished or chromed or provided with a nickel plating. It has also been found that molybdenum or tungsten are particularly suitable for the plasma channel. In the flange-like portion 112 of the plasma channel, there is formed an annular canal 113 open at the inner periphery for sucking in powder that is supplied by a suction tube 114 from a supply such as is illustrated in FIG. 2. Plasma channel 111 and flange portion 112 are brazed or soldered to the interior of a hollow member 115 of brass and together therewith form a plasma channel ring member 116. The length and diameter of the plasma channel can be accommodated to the desired thickness of the jet. A narrower and longer channel produces sharp focussing of the powder in the plasma jet. For the dimensions of the embodiment the length of the plasma channel can vary between 10 and 20 millimeters, and the diameter between 4 and 5 millimeters. Coolant is supplied through the tube connector 20 of the plasma channel ring member 116. The aforementioned structural components can be pressed together and assembled in the casing 3 by means of a screw-type closure plate 21, for example of steel. The screw-type closure plate 21 is electrically insulated from the plate-shaped cathode holder 1 by means of an insulating disc 22, for example of PVC. The described prototype of a plasma burner series for various amounts of power is suitable for a gas throughput of 4 to 25 liters per minute for power inputs of about 1 to 12 kilowatts. With these power values and the given measurements, there is great assurance that the arc will not reach the nozzle. It is essential that the depth of insertion of the pin-shaped electrode 2 into the burner channel 8 be a third of the length of the burner channel, which is in the order of magnitude of substantially 2 to 4 channel diameters.

The connecting tubes 5 and 20 for a coolant such as water can simultaneously be used for supplying the current. In order to avoid an electrical shunt or short-circuit across the coolant at very high power values, distilled water must be used, or a separate electrical connection must be provided for the burner channel. In FIG. 3, the electrical connection is diagrammatically shown by the battery 23 and the adjustable limiting resistance R. The nozzle 9 can otherwise be electrically insulated.

By suitably greater dimensioning of the structural components, the plasma spray gun constructed in accordance with the invention can easily be constructed for higher power values.

When the plasma spray gun is constructed in accordance with our invention by methods of manufacturing with standardized parts, it is always readily possible to exchange and replace damaged components. This is also made possible by the fact that the individual structural components are connected by a cooling canal system which is sealed by rubber seals or washers in annular grooves 25 at the transition locations between the individual structural components. The cooling canal system is formed by cylindrical coolant slots 18 through which annular slots 17 extend in a radial direction, as well as by axial bores 19. Annular divisions 24 are made at the transition locations between the structural components.

In order to screen cool marginal zones from the plasma jet 26, a diaphragm or screen 27 can be screwed by the holders 29 to the plasma spray gun. The diaphragm 27 can be made of rustproof or stainless steel, and can be cooled by a coolant through a coolant channel 28.

The electrode potential of cathode and anode can be interchanged without any essential disadvantages. Also, alternating voltage can be applied to the electrodes when the frequency is so high that the arc does not extinguish. For all types of current supply, the plasma spray gun can be ignited by a short application of high frequency voltage at the electrodes.

Figure 4:
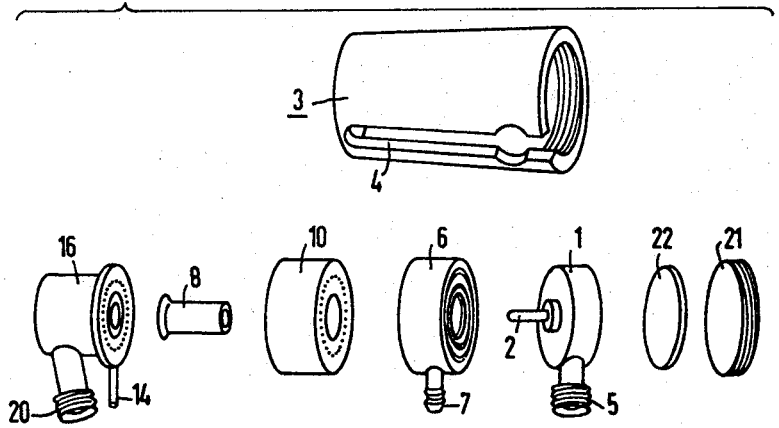
FIG. 4 is a perspective exploded view of the plasma spray gun shown in FIG. 3.

In FIG. 4, the exploded structural components of the plasma spray gun of FIG. 3 are shown in perspective and similar components are provided with the same reference numerals as in FIG. 3.

Figure 5:
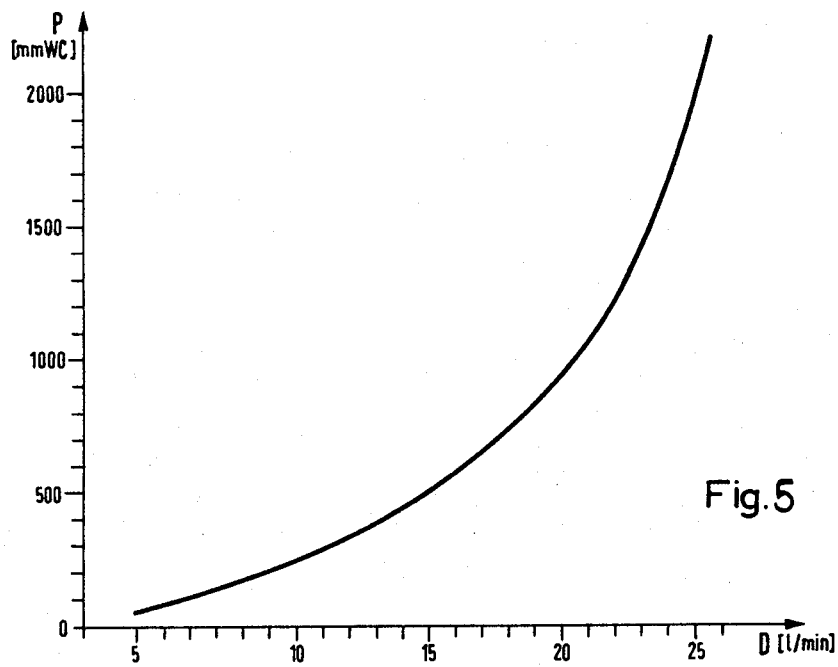
FIG. 5 is a plot diagram of the suction negative pressure relative to the working gas throughput.

In FIG. 5, the negative pressure P, with which the powder is sucked in, is shown along the ordinate in millimeters of water column. The abscissa shows the throughput D in liters per minute. The characteristic curve is recorded for argon as the working gas. These values were obtained for a plasma spray gun with the following data: Burner channel length 20 mm. for a diameter of 5 mm. Cathode diameter 4 mm. for an insertion depth of 4 mm. in the burner channel. The nozzle is 6 mm. long overall and has a diameter of 3 mm. The plasma channel is 10 mm. long for a diameter of 4 mm. From the diagram of FIG. 6 the automatic control of the plasma spray gun is believed to be quite clear.

Figure 6:
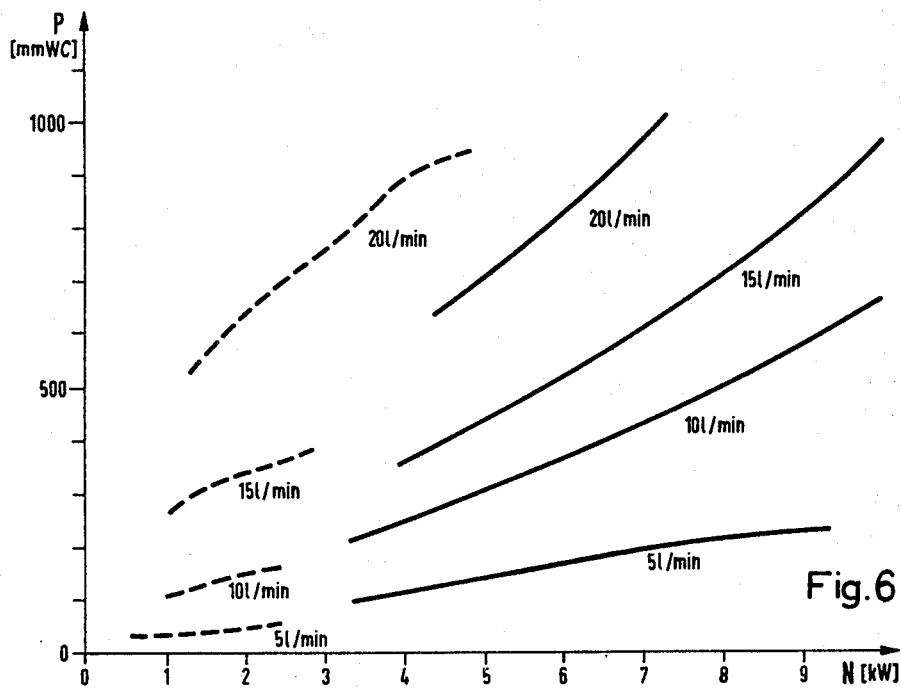
FIG. 6 is a plot diagram for various throughputs of the working gas of the suction negative pressure relative to the arc power.

In FIG 6, the negative pressure P at the powder suction tube is again shown along the ordinate in millimeters of water column, and the power N in kilowatt hours received by the electric arc is indicated along the abscissa. The broken line curves relate the argon as working gas and the solid line curves are for nitrogen. The gas throughput in liters per minute as parameters are indicated at the respective curves. The measurement values, according to FIG. 6, were obtained with the same plasma spray gun as those which are given in the plot diagram of FIG. 5. From FIG. 6 the power-dependent automatic control of the suction pressure for the powder can be readily recognized.

All gases which are not particularly aggressive or deleterious to the employed structural materials are generally suitable as working gas. Since gases having single-atom molecules can absorb less energy through ionization than gases having two-atom molecules can by dissociation and ionization, the single atomic noble or inert gases are particularly suitable for ignition. The use of gases having molecules with more atoms, however, suffer from the disadvantage that due to recombination in the presence of the workpiece, energy is again set free in the form of heat. Nitrogen-argon mixtures in all kinds of mixing ratios have been shown to be particularly suitable therefor. Argon-hydrogen mixtures up to a maximum of 20% hydrogen are ignited relatively easily and are suitable for working materials that do not have too great a heat conductivity.

By means of auxiliary devices or relatively simple modifications, the plasma spray gun constructed in accordance with our invention affords further applications. Thus, plasma currents or gas currents with supersonic flow can be achieved if the plasma channel is connected in series with a Laval nozzle. Instead of sucking powder through the powder suction tube, an additional gas can also be added through this suction channel. By means of suitable gas mixtures, one can therewith, independently of the burning characteristics of the arc, adjust to any desired temperature within a wide range. Since there is given a gas sucked in through the suction channel 114 into the hot plasma, which one can cool off rapidly by means of a Laval nozzle connected in series thereafter, the plasma spray gun constructed in accordance with our invention is suitable also for carrying out chemical reactions.

Without any kind of auxiliary connections, the plasma spray gun in accordance with our invention is suitable also for cutting work materials which are poor heat conductors. The powder suction channel can then be closed. For an open powder suction channel, a corrosive gas, or in other cases a protective gas, can be added.

If the plasma spray gun is to receive a powder from a receptacle which is located several meters distant from the working location, the receptacle can be subjected to an over-pressure to compensate for the flow losses in the suction tube. The advantages of the plasma spray gun constructed in accordance with our invention thereby remain fully preserved because the powder, as in the embodiment of FIG. 3, is still sucked in; the pressure difference is adjusted only to the increased length of the suction tube or duct.

While the invention has been illustrated and described as embodied in an apparatus for uniform feeding of powder in a plasma spray gun, it is not intended to be limited to the details shown since various modifications and structural changes may be made without departing in any way from the spirit of the present invention. Other adaptations should and are intended to be comprehended within the meaning and range of the equivalents of the following claims.

What is claimed is:

1. Plasma spray apparatus comprising a burner channel, feed pipe means connected with said burner channel for supplying a flow of plasma-producing gas thereto, electrode means for forming an arc in said channel so as to generate a plasma from the gas flowing through said channel, nozzle means located in said channel downstream from the arc, an elongated plasma passage having an end connected with the downstream end of said burner channel and an outlet at the other end thereof, said plasma passage being traversable by the generated plasma for discharging the plasma through said outlet, and powder supply means communicating with said plasma passage at a location downstream from said nozzle means, and distant from said outlet for feeding a powder to the generated plasma traversing said plasma passage, said electrode means comprising a pin-shaped cathode and an anode member forming said burner channel, said burner channel being cylindrical and having an axial length in the order of magnitude of substantially two to four diameters of said burner channel, said cathode extending into said burner channel a distance up to substantially one-third the axial length of said burner channel, said nozzle means being located at said downstream end of said burner channel, and said powder supply means comprising a powder suction tube connected with said plasma passage at said downstream end of said burner channel.

2. Plasma spray apparatus comprising a substantially cylindrical casing and a plurality of structural components removably assembled in said casing, said components comprising a plate-shaped cathode holder mounted in said casing, a pin-shaped cathode carried by said holder and inserted substantially centrally in said casing, an electrically insulating ring surrounding said pin-shaped cathode and spacing said cathode holder from said casing, an anode member mounted in said casing and formed with a burner channel coaxially aligned with said pin-shaped cathode, said cathode extending into one end of said burner channel, feed pipe means extending through said casing and connected with said one end of said burner channel for supplying a flow of plasma-producing gas thereto, said cathode and said anode means forming an arc in said channel so as to generate a plasma from the gas flowing through said channel, a nozzle located in said burner channel at the other end thereof, a cooling ring member surrounding said burner channel, an elongated plasma passage having an end connected with said other end of said burner channel and an outlet at the other end thereof, said plasma passage being traversable by the generated plasma for discharging the plasma through said outlet, and powder supply means including a powder suction tube communicating with said plasma passage at a location downstream from said nozzle and distant from said outlet for feeding a powder to the generated plasma traversing said plasma passage.

3. Plasma spray apparatus according to claim 2 wherein said casing has a threaded opening, and including a screw-type closure plate for threadedly closing said opening, and an insulating disc engageable by said closure plate for pressing said structural components together.

4. Plasma spray apparatus according to claim 1, including a suction ring for said powder supply means, said suction ring being open along the entire inner peripheral surface of said burner channel.

5. Plasma spray apparatus according to claim 1 wherein said plasma channel has a highly polished surface and consists of copper coated with a metal selected from the group consisting of chrome and nickel.

References Cited

UNITED STATES PATENTS

| | | | |
|---|---|---|---|
| 528,417 | 10/1894 | Duckham. | |
| 2,069,623 | 2/1937 | Pickhaver et al. | 314—68 |
| 2,233,304 | 2/1941 | Bleakley | 239—80 |
| 2,851,581 | 9/1958 | Libby | 219—74 |
| 2,923,811 | 2/1960 | Feldmeyer et al. | 219—121 |
| 3,114,826 | 12/1963 | Sullivan et al. | 219—76 |
| 3,127,502 | 3/1964 | Freeman | 219—121 |
| 3,145,287 | 8/1964 | Siebein et al. | 219—76 X |

FOREIGN PATENTS 237,873  3/1962  Australia.

RICHARD M. WOOD, *Primary Examiner.*

J. G. SMITH, *Assistant Examiner.*